March 18, 1924.

L. F. FULLER

ELECTRICAL CONDENSER

Filed June 16, 1919

1,487,096

WITNESS
H. A. Sherburne

INVENTOR
L. F. FULLER
BY White & Prost
his ATTORNEYS

Patented Mar. 18, 1924.

1,487,096

UNITED STATES PATENT OFFICE.

LEONARD F. FULLER, OF PALO ALTO, CALIFORNIA, ASSIGNOR, BY MESNE ASSIGNMENTS, TO FEDERAL TELEGRAPH COMPANY, OF SAN FRANCISCO, CALIFORNIA, A CORPORATION OF CALIFORNIA.

ELECTRICAL CONDENSER.

Application filed June 16, 1919. Serial No. 304,599.

*To all whom it may concern:*

Be it known that I, LEONARD F. FULLER, a citizen of the United States, and a resident of Palo Alto, county of Santa Clara, and State of California, have invented a certain new and useful Electrical Condenser, of which the following is a specification.

The invention relates to electrical condensers and particularly to condensers for use in radio transmission systems.

An object of the invention is to provide means for increasing the voltage that a condenser will withstand.

Another object of the invention is to increase the corona voltage of a condenser.

The invention possesses other advantageous features, some of which, with the foregoing, will be set forth at length in the following description where I shall outline in full, that form of the invention which I have selected for illustration in the drawings accompanying and forming part of the present specification.

The construction of this invention is particularly applicable to condensers consisting of alternate layers of mica or other dielectric and metal foil. When condensers of this nature are employed in continuous oscillation radio transmission systems, corona forms at the ends of the condenser and it is the object of my invention to prevent or greatly reduce the production of corona. I have found that it is possible to greatly increase the voltage a condenser will withstand by arranging flux distributors at the ends of the condenser. The function of the flux distribution shields is to eliminate all sharp edges and points at the ends of the condenser and thereby increase the voltage at which the corona will form.

Figure 1:
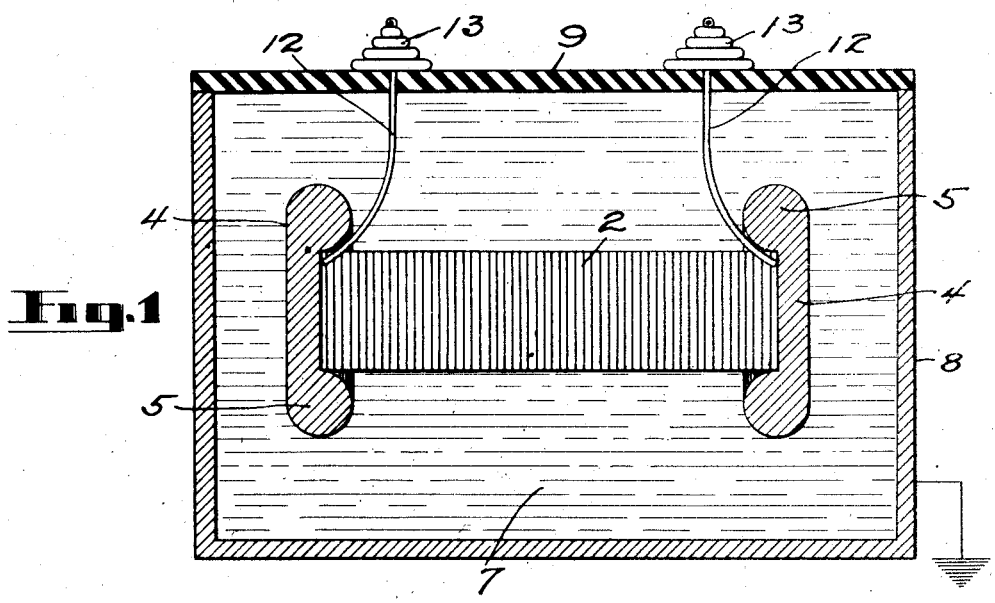
Figure 1 is a vertical longitudinal section through a condenser constructed in accordance with my invention.
Figures 2, 3:
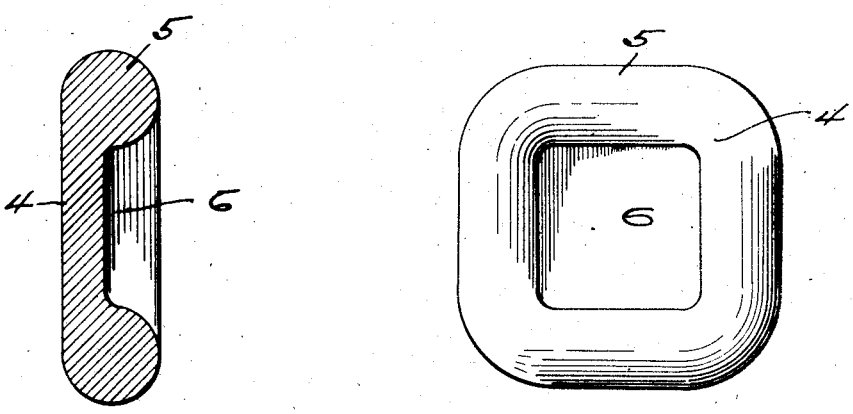
Fig. 2 is a vertical section through one of the flux distributing shields.
Fig. 3 is a front elevation of one of the shields.

The device of my invention comprises a condenser 2, formed of alternate layers of mica or other dielectric and metal foil, with sheets of metal foil at the ends of the series of layers. Arranged at the ends of the condenser and in contact with the end metallic layers are metallic flux distributing shields 4, preferably formed of brass or aluminum. The flux distributing shields are formed with curved surfaces of comparatively large radius, presenting no sharp edges which would encourage the production of corona. The shields are preferably formed with a large peripheral bead 5, of circular or substantially circular cross-section and within the bead, the body of the shield is depressed, forming a recess 6, in which the end of the condenser is disposed. The bead joins the body in smooth curves, thereby eliminating all sharp edges from the shield. The condenser plates themselves may be formed with rounded corners, instead of sharp corners, to further discourage the formation of corona.

The condenser, with the shields arranged on the ends, is embedded in a suitable insulating compound 7, such as a mixture of beeswax, paraffine and rosin, which is contained in a metallic case 8, which case is preferably grounded for safety. The case is closed by a cover of insulating material 9, through which the leads 12 pass. The leads from the condenser to the terminals are preferably formed of copper tubing or round bars, to eliminate all sharp edges. The terminals of the lead conductors pass through insulators 13 arranged on the cover and the terminals and the insulators are formed with smooth curved surfaces, to discourage the formation of corona.

My invention involves not only a means for discouraging the formation of corona, which permits the condenser to withstand a much higher voltage, but also includes a method of increasing the working voltage of a condenser by increasing its corona voltage.

I claim:

1. In an electrical condenser having a pair of terminal plates, a metallic shield having a surface engaging substantially the entire free surface of one of the terminal plates, said shield having smooth and rounded surfaces only.

2. In an electrical condenser having a pair of terminal plates, a metallic shield having a bead forming a recess, said bead and recess engaging substantially the entire free surface of one of the terminal plates, said shield having smooth and rounded surfaces only.

3. The combination with a condenser of metallic plates, arranged at the ends of the condenser, each plate being provided with a curved peripheral bead surrounding a recess in which the end of the condenser is disposed.

In testimony whereof, I have hereunto set my hand at San Francisco, California, this 7th day of June, 1919.

LEONARD F. FULLER.

In presence of—
H. G. PROST.